United States Patent [19]

Wydrinski

[11] Patent Number: 5,168,942
[45] Date of Patent: Dec. 8, 1992

[54] RESISTIVITY MEASUREMENT SYSTEM FOR DRILLING WITH CASING

[75] Inventor: Raymond Wydrinski, Lewisville, Tex.

[73] Assignee: Atlantic Richfield Company, Los Angeles, Calif.

[21] Appl. No.: 779,651

[22] Filed: Oct. 21, 1991

[51] Int. Cl.$^5$ .................... E21B 49/00; E21B 4/00
[52] U.S. Cl. ....................... 175/50; 175/107; 175/258
[58] Field of Search ............ 175/50, 40, 107, 263, 175/257, 258; 73/152

[56] References Cited

U.S. PATENT DOCUMENTS

| | | | |
|---|---|---|---|
| 3,369,618 | 2/1968 | Moore | 175/258 X |
| 3,964,556 | 6/1976 | Gearhart et al. | 175/45 |
| 4,462,469 | 7/1984 | Brown | 175/40 |
| 4,468,762 | 8/1984 | Jürgens | 175/50 X |
| 4,684,946 | 8/1987 | Issenmann | 175/50 X |
| 4,785,247 | 11/1988 | Meador et al. | 324/338 |
| 4,875,531 | 10/1989 | Biehl et al. | 175/107 X |
| 4,955,438 | 9/1990 | Juergens et al. | 175/50 X |
| 5,052,502 | 10/1991 | Jurgens et al. | 175/257 X |

*Primary Examiner*—Hoang C. Dang
*Attorney, Agent, or Firm*—Albert C. Metrailer

[57] ABSTRACT

A system for measuring earth formation resistivity while drilling a wellbore through an earth formation using a self-contained drilling assembly supported at the lower end of a casing string. The drilling assembly includes a drilling fluid driven motor driving a drill bit, where the motor and bit are electrically isolated from the casing string. Formation resistivity measuring circuitry is provided in the assembly. Data transmission mechanism is provided for encoding the resistivity data and transmitting it through the drilling fluid to the surface location of the wellbore.

5 Claims, 2 Drawing Sheets

RESISTIVITY MEASUREMENT SYSTEM FOR DRILLING WITH CASING

BACKGROUND OF THE INVENTION

The present invention relates to a drilling assembly wherein a drill bit, a bit drive motor and resistivity measurement while drilling instrument are carried on the end of a drill string made of casing and are retrievable through the casing which may be left in the wellbore to serve as the permanent casing or wellbore liner.

Conventional rotary drilling operations require relatively frequent withdrawal of the conventional drill string from the wellbore to inspect or replace the drill bit or portions of the drill string, to perform well logging operations and to install permanent well casing. This insertion and withdrawal process is time consuming, hazardous to the operating personnel and increases the possibility of damaging the well due to inadvertent dropping of the drill string into the wellbore or encountering the influx of formation fluids into the wellbore due to the swapping effect encountered during the drill string insertion and removal process.

Various efforts have been made to limit the need to insert and withdraw the drill string for well logging purposes. For example, Meader, et al U.S. Pat. No. 4,785,247 issued on Nov. 15, 1988, provides an electromagnetic resistivity measurement system built into the drill string itself to allow measurement of formation resistivity during the drilling process. Gearhart, et al U.S. Pat. No. 3,964,556 issued on Jun. 22, 1976 provides a system for transmitting information, such as the resistivity measurement generated by the Meador system, from the lower end of a drill string through the drilling fluid to equipment at the surface location of the borehole. While the Gearhart patent suggests that transmission of information through the drilling fluids should occur only at a time when actual drilling has ceased, later developments have allowed continuous transmission of logging while drilling information. See, for example, the publication entitled, "Development and Successful Testing of a Continuous-Wave, Logging-While-Drilling Telemetry Systems" by B. J. Patton, et al. pages 1215-1221, Journal of Petroleum Technology, Oct. 1977.

SUMMARY OF THE INVENTION

The present invention provides a system for measurement of formation resistivity and transmission of that information to the surface location of the borehole in a drilling with casing system. In one form of the invention, the drill bit itself is used as one electrode in a direct measurement system with the casing forming the return electrode. In this system, the bit drive motor and bit are electrically insulated from the casing. In a second embodiment of the present invention, an inductive resistivity system is provided for use when drilling with non-conductive, typically oil-based, drilling fluids. In this system the induction loops are carried on the outside of the casing and electrical contacts are provided on the inside of the casing for connection to an electronics package carried in the retrievable drilling assembly.

In all embodiments of the present invention the bit drive motor, electronic measurement and signal transmission package are all contained within a retrievable bit assembly which locks in to the lower end of the casing string during drilling operations.

BRIEF DESCRIPTION OF THE DRAWINGS

The present invention may be better understood by reading the following description of the preferred embodiments with reference to the accompanying drawings wherein.

DESCRIPTION OF THE PREFERRED EMBODIMENTS

Figure 1:
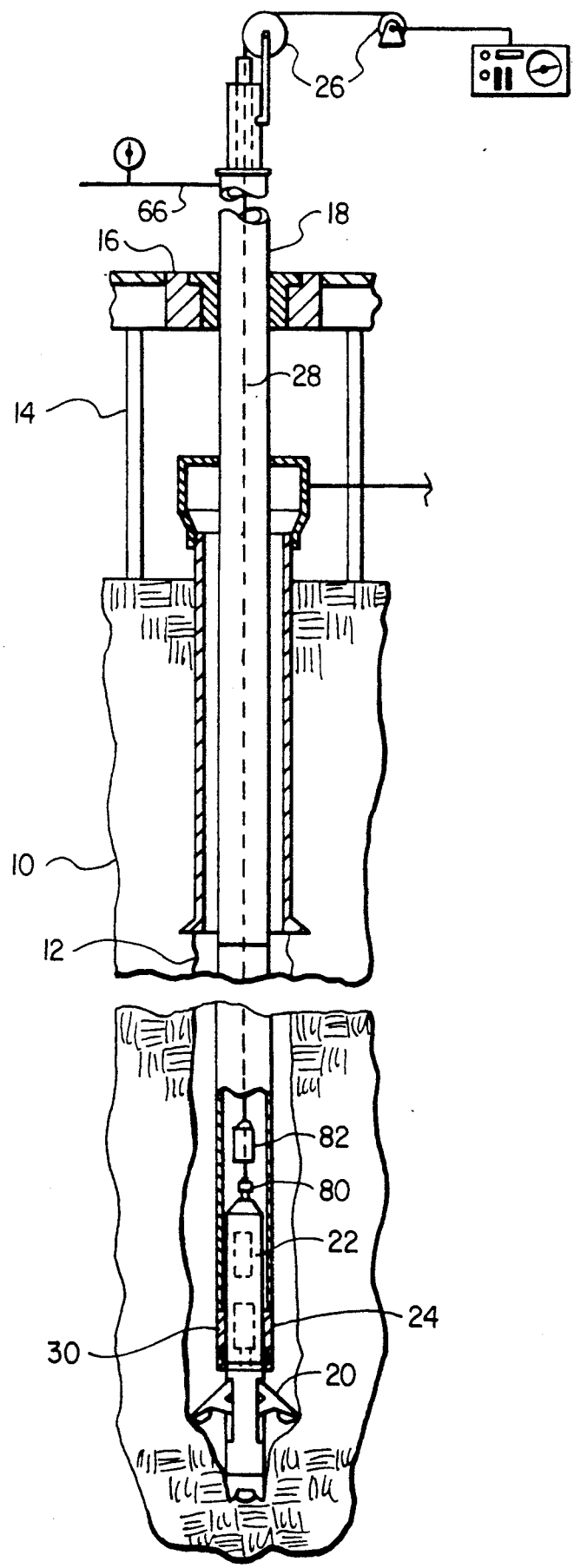
FIG. 1 is a vertical section view in schematic form of a wellbore being drilled by the method and apparatus of the present invention.

With reference to FIG. 1, there is illustrated an earth formation 10 through which a wellbore 12 is being drilled by a drilling assembly in accordance with the present invention. A portion 14 of a conventional drilling rig including a rotary table 16 is used to support the upper end of a drill string 18, which in the present invention is formed of casing rather than the conventional drill pipe sections. In the present invention the rotary table 16 is used only to position and support casing 18 and not used to rotate the rotary drill bit 20 carried on the lower end of drill string 18.

The wellbore 20 is being formed by the rotary drill bit, assembly 22, which includes bit 20, connected to the lower end 24 of the drill string 18. The bit assembly 22 is adapted to be retrieved from the wellbore 12 through the interior of drill string 18 without removing the drill string from the wellbore. The drill string 18 is made up of end-to-end coupled tubular pipe or casing sections which may be threadably connected to each other in a conventional manner using conventional coupling or threaded in parts known to those skilled in the art of well drilling. The casing is selected so that the drill string 18 may be cemented in place within the wellbore and not retrieved or removed from the wellbore upon completion of drilling. As a result, the bit 20 includes cutting means thereon which are operable to form wellbore 12 to a diameter larger than the diameter of the drill string 18 itself but which are retractable to allow the bit assembly 20 to be removed through the drill string 18. The bit assembly 22 may be inserted in and withdrawn from the drill string 18 using conventional equipment 26 for lowering and retrieving a wireline 28, or electric logging cable, as illustrated. Alternatively, the bit assembly 22 may be pumped down the casing 18 by use of drilling fluids and may be retrieved by reverse flow of such drilling fluids. In any case, the lower end of the drill string 18 is preferably provided with a sub 30, illustrated in more detail in FIGS. 2A and 2B which is adapted to receive and secure the bit assembly to the lower end of the drill string 18.

Figure 2A:
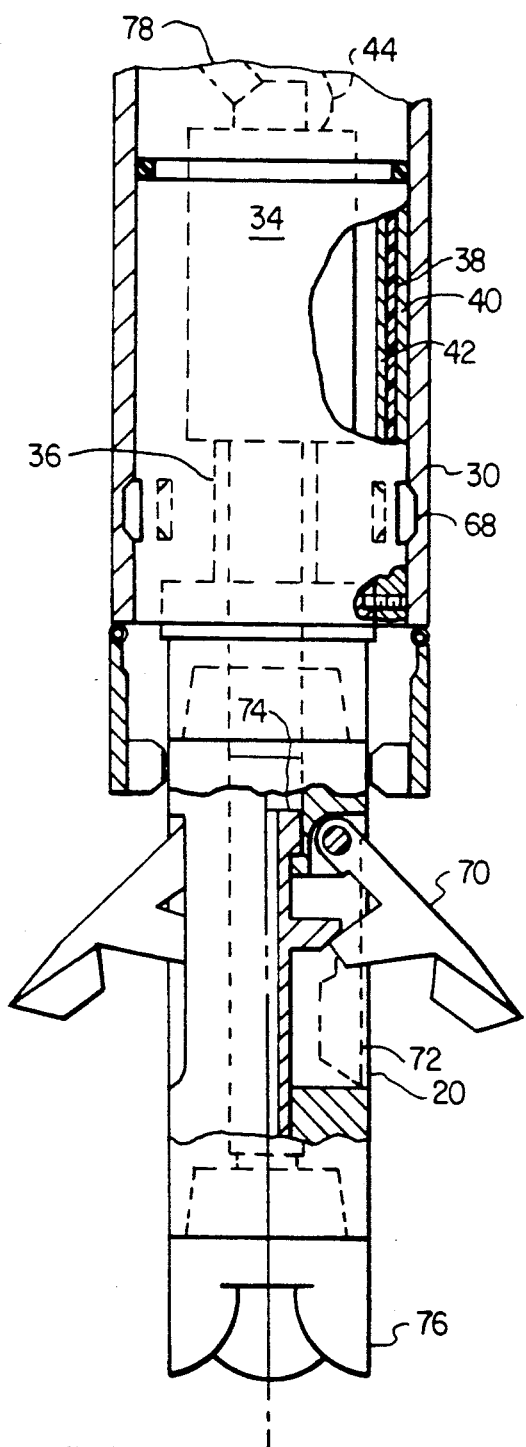
FIGS. 2a and 2b are detailed views of the bottom and top portions of the retrievable drilling and measurement while drilling system according to the present invention.
Figure 2B:
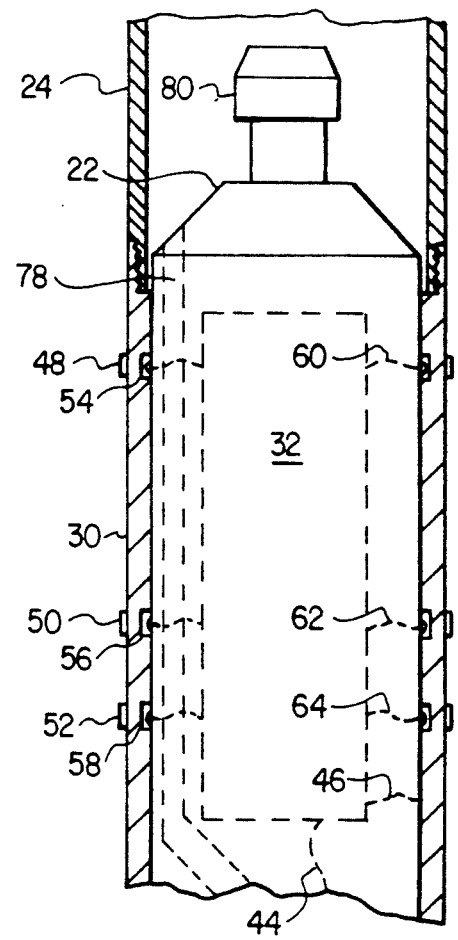

With reference to FIGS. 2A and 2B there is illustrated additional details of the drilling assembly 22, lower end of drill string 24 and the latching sub-assembly 30. Within the outer body member of assembly 22 are contained two primary systems. A measurement and data transmission system 32 is contained in the upper end of assembly 22 as illustrated in FIG. 2B. A fluid driven motor 34 is contained in the lower portion of assembly 22 as illustrated in FIG. 2A. A drill bit 20 is connected to and driven by an output shaft 36 extending from motor 34.

The measurement circuitry 32 preferably includes circuitry both for measuring formation resistivity by direct current, DC methods, or induction methods, both of which are well known in the art. Where conductive drilling fluids are used, the DC resistivity measurement may be made if two electrodes are made available. In the present invention, the drill bit 20, and casing 30 are used as electrodes for making the resistivity measurements. As illustrated in FIG. 2A, the drilling motor 34 is electrically insulated from casing 30 by means of a dielectric member 38, between the outer wall 40 of assembly 22 and inner wall 42. Outer and inner walls 40 and 42 are simply concentric cylinders bonded together by the dielectric 38. The dielectric 38 may preferably be a fiberglass material, that is, a matrix of glass fibers embedded in a resin material. For the DC resistivity measurements, measurement system 32 has one lead 44 connected to the motor 34 and a second lead 46 connected to sub 30 by contact through the outer wall 40 of assembly 22. By application of a known current through these leads and the formation and measurement of the resulting voltage, a conventional resistivity measurement is obtained. While referred to as a DC measurement, the actual current applied may be of a low frequency alternating current or square waveform in order to avoid polarization at metal surfaces from which current passes to and from the drilling fluid.

The measurement system 32 also contains a somewhat conventional electromagnetic wave propagation resistivity measurement system for use with non-conductive drilling fluids. This system includes antenna coils 48, 50 and 52 mounted on the outer surface of sub 30. Corresponding electric contacts 54, 56 and 58 are mounted on recesses on the inner surface of sub 30 to allow measurement system 32 to make contact to the coils 48, 50 and 52. Spring loaded contact pairs 60, 62 and 64 are provided on the outer surface of assembly 22 for making contact between the outputs of measurement circuitry 32, and the coils 48, 50 and 52. In a typical system, spacing between coils 48 and 50 is twenty four inches while coils 50 and 52 are spaced six inches apart. By applying a high frequency AC signal to coil 48, an electromagnetic signal is transmitted from coil 48 and passes through the surrounding formations. The transmitted signal induces currents within the formation which in turn generate signals which are detected by coils 50 and 52. By analyzing time, amplitude and phase shifts of signals received at coils 50 and 52 in a well-known manner, formation resistivity may be determined. See, for example, the above-referenced patent to Meador et al.

If sub 30 is replaced with a nonconductive material, the electromagnetic wave propagation system can be replaced with a low frequency induction resistivity system. The induction coils of such an induction system could be carried directly on the outer surface of assembly 22.

The resistivity measurements generated by the DC or inductive measurement system are provided to the data transmission portion of system 32. The signals are transmitted through the drilling fluid to the surface location of the well where they are then detected and recorded. Any conventional data transmission system such as that described in the above-referenced Gearhart, et al. patent is suitable for this purpose.

The retrievable bit assembly 22 of the present invention is put into use either by lowering through the casing string 18 by wireline means 26 or is pumped down by use of drilling fluid pumped through conduit 66 of FIG. 1. Upon reaching the sub 30 at the lower end of the drill string, suitable radially moveable locking dogs 68 are disposed and moved into a position to lock the bit assembly 22 to the sub 30 to prevent axial or rotational movement with respect to the drill string. During the insertion process, cutter arms 70 remain in a retracted position illustrated at 72. When the drilling assembly is locked into place at the lower end of the drill string, drilling fluid pressure is increased and acts upon piston face 74 to cause cutter arms 70 to be cammed out into their extended position as illustrated in the figures. A conventional roller cone drill bit is attached below cutter arm 70. Once the arms 70 have been extended, drilling fluid is pumped through conduit 78 to the drilling motor 34 which rotates bit assembly 20. The entire drilling assembly may be retrieved from the bottom of the wellbore for repair or replacement of any of the parts without removing the entire drill string 18. The installation process is simply reversed to place the cutter arms 70 in the retracted position, to release the locking dogs 68 and to pull the assembly 22 from the bottom of the hole. A fishing neck 80 is positioned at the upper end of drilling assembly 22 to provide the means for a wireline fishing tool 82 to mechanically latch on to the drilling assembly 22. Alternatively, drilling fluid pumping direction may be reversed to hydraulically force the assembly 22 up the casing string 18 for removal from the wellbore.

While the present invention has been illustrated and described with reference to particular apparatus and methods of use, it is apparent that various modifications and changes can be made therein without departing from the spirit of the present invention as defined by the appended claims.

What is claimed is:

1. Apparatus for measuring earth formation resistivity while drilling a wellbore in an earth formation comprising;
   an elongated tubular drill stem made up of end-to-end coupled sections of tubular pipe members;
   a retrievable bit assembly including a body member and locking means on a lower distal end of said drill stem for releasably locking said bit assembly to said drill stem for axial movement with said drill stem to form said wellbore;
   said bit assembly including a motor carried within said body member having an output shaft and a radially extendable and retractable cutter means carried on said output shaft for cutting said wellbore to a diameter at least slightly larger than the diameter of said drill stem;
   means for measuring formation resistivity carried within said body member; and
   means carried within said body and connected to said measuring means for transmitting formation resistivity data from said lower end of said drill stem through fluid within said drill stem to the surface location of said wellbore.

2. Apparatus according to claim 1 further including a sub carried on the lower end of said drill stem and wherein said locking means are carried by said sub.

3. Apparatus according to claim 1 wherein:
   at least said cutter means is electrically insulated from said drill stem;
   said measuring means comprises an electric current source connected between said cutter means and said drill stem and means for measuring voltage between said cutter means and said drill stem.

4. Apparatus according to claim 1 wherein:
said measuring means comprises electromagnetic transmitting and receiving coils and electromagnetic signal generating and receiving means connected to said coils.

5. Apparatus according to claim 4 wherein said coils are carried on the outer surface of said sub, said signal generating and receiving means are carried within said body member and further including electrical coupling means for coupling electromagnetic signals from said signal generating and receiving means to said coils.

* * * * *